United States Patent [19]

Rutter et al.

[11] Patent Number: 4,796,363
[45] Date of Patent: Jan. 10, 1989

[54] MEANS FOR SUPPORTING A GAGING DEVICE SUCH AS A DIAL BORE GAGE DURING THE SETTING THEREOF

[75] Inventors: Harold T. Rutter, Kirkwood; Joseph F. Ondrus, St. Louis, both of Mo.

[73] Assignee: Sunnen Products Company, St. Louis, Mo.

[21] Appl. No.: 142,192

[22] Filed: Jan. 11, 1988

[51] Int. Cl.$^4$ .............................................. G01B 5/12
[52] U.S. Cl. ........................... 33/164 R; 33/143 H; 33/178 R
[58] Field of Search ............... 33/178 R, 163, 164, 33/165, 168 B, 143 R, 147 K, 143 H, 167

[56] References Cited

U.S. PATENT DOCUMENTS

| | | | |
|---|---|---|---|
| 2,893,128 | 7/1959 | Carlson et al. | 33/143 H |
| 2,933,815 | 4/1960 | Czaplinski | 33/143 H |
| 3,496,758 | 2/1970 | Sunnen | 33/167 X |
| 4,509,267 | 4/1985 | Flaten | 33/147 K X |

Primary Examiner—Harry N. Haroian
Attorney, Agent, or Firm—Haverstock, Garrett & Roberts

[57] ABSTRACT

A gage support device for mounting on a setting fixture having spaced opposed fixture setting surfaces in position to support by suspending a gage such as a dial bore gage in position with the contact portion of the gage including the work engaging contacts positioned between the fixture setting surfaces. The support device has adjustment features that can be adjusted so that the device can accomodate gages of different sizes and ranges including an adjustment feature for adjusting the height at which the gage is supported on the setting fixtures, an adjustment feture for adjusting the horizontal position at which the gage is supported on the setting fixture, and an adjustment feature for adjusting the angular orientation of the gage as it is suported relative to the setting fixture.

24 Claims, 4 Drawing Sheets

MEANS FOR SUPPORTING A GAGING DEVICE SUCH AS A DIAL BORE GAGE DURING THE SETTING THEREOF

BACKGROUND OF THE INVENTION

The present invention relates to means for accurately adjusting or presetting a measuring instrument such as the contacts on a dial bore gage, and more specifically, to support means which enable more precise adjustment and presetting of the location and alignment of gaging contacts on a gaging device with the setting surfaces on a device such as a setting fixture.

DESCRIPTION OF RELATED ART

Gages such as dial bore gages used for measuring and gaging internal diameters and surface characteristics of bores are often difficult to precisely set and calibrate because known fixtures for supporting or holding the dial bore gages during adjustment and calibration on a setting fixture, if available at all, generally do not provide accurate enough means for aligning and positioning the gaging contacts with the surfaces to be engaged therewith on the setting fixture and the known fixtures do not provide means for supporting the gage by suspending it on the fixture. More specifically, prior art holding and supporting means on setting fixtures hold the dial bore gage at the contact end in fixed position on the setting fixture but no means are provided to make adjustments as to the position of the gage once it is on the setting fixture beyond means that are preset at the factory to grip and hold the gage but which are not adjustable to establish alignment. This means that any misalignment due to imperfections in the gage and/or in the fixture when manufactured have to be tolerated, and to the extent that there are errors, imperfections in the gage and fixture will produce errors in the gage setting and hence the gage accuracy. Therefore, with known devices, adjustment of the position of the gage on to the setting fixture is extremely limited or non-existent, and no provision is made on known devices to establish precise orientation and alignment of the gaging contacts relative to the fixture setting surfaces. Also, with known devices, as the distance between gaging contacts and fixture surfaces increases, errors due to misalignment increase which means that greater errors occur as the gaging distance increases. The main culprit in this regard is angular misalignment which produces greater error the greater the distance between the gage contacts to be set.

Furthermore, with known devices, it is not generally practical to use the same setting fixture to set the contacts of dial bore gages that cover substantially different dimensional ranges because such a setting fixture would require a separate holder or nest for supporting each different size or range of dial bore gage, and this is especially troublesome as the range of the gages becomes smaller. Also, the known fixture support means generally engage and support the gages at or adjacent to the end where the gaging contacts are located and do not include means to orient the gage contacts in different angular orientations to establish alignment between the gage contacts and the fixture surfaces. With such fixtures, it is generally required that the operator hold the gage in position and this can stress the gage and cause inaccuracies. These are not limitations of the present gage support means. Also, if a prior art gage holder or nest is jarred or becomes damaged, it may be necessary to discard the gage support means or return it to the factory for repair or replacement.

Since known holders or nests are not adjustable and are designed to support a particular size or sizes of dial bore gages, if various size dial bore gages are to be set, a plurality of holders or nests will be needed for each fixture to accommodate the different gage sizes and this requires an inventory of holders and/or fixtures to accommodate the full range of gages, and each gage holder or nest must be manufactured, calibrated, checked for accuracy, stored and located when needed. Also, because such known devices are not adjustable to correct for inaccuracies this is a further and important limitation of such devices.

SUMMARY OF THE INVENTION

The present invention overcomes these and other disadvantages and limitations associated with known gage setting and calibration means and teaches the construction and operation of novel gage support means, sometimes referred to as nest means, used for adjusting and setting the gaging contacts on a device such as a dial bore gage. The present device includes means for securely and adjustably supporting in a suspended condition a measuring instrument such as a dial bore gage in relation to a calibration or measuring device such as a dial bore gage setting fixture. The present support or nest means includes means for establishing precise alignment between gaging contacts of a dial bore gage regardless of the gage size and setting surfaces on the setting fixture. The present nest or support assembly is constructed to be mounted on a setting fixture in position thereon so that when supporting a dial bore gage, the gage is supported in a suspended position extending downwardly from its gaging end with the gaging contacts on the gage located between the measuring or setting surfaces on the setting fixture and without requiring that the operator hold the gage when so positioned. The present assembly provides means for adjusting the alignment of the gaging contacts of the gage to the setting surfaces of a setting fixture including providing means for accomplishing this by means which enable adjustment of the gage contacts in a plurality of different angularly related planes relative to the fixture setting surfaces sometimes referred to as providing adjustment in different degrees of freedom. Specifically, the present device provides for this possibility in four different planes. This is possible with the present gage support assembly because it supports the gage to be adjusted or preset on the fixture in a suspended condition with the gaging contacts positioned extending between the fixture setting surfaces used for setting them. This is to be distinguished from known support devices which engage and fixedly locate the end portion of the gage that has the contacts to be set on it in a nest or like device constructed to hold and locate the contact portion of the gage while being set. Typical of known setting fixtures is the fixture disclosed in Sunnen U.S. Pat. No. 3,496,758, issued Feb. 24, 1970. Typical of known dial bore gages having contacts of the type that need to be accurately set using a setting fixture is the fixture disclosed in Rutter U.S. Pat. No. 4,045,877, issued Sept. 6, 1977.

More specifically, the present assembly includes a gage support structure so constructed that a gage can be vertically, horizontally and angularly adjusted or oriented relative to several angularly related planes. Being able to accurately locate and align the gage contacts with the fixture surface in the manner disclosed herein to provide accurate alignment therebetween is extremely important because the more precise the alignment, the more accurate will be the gage setting. Furthermore, because of the manner in which the dial bore gage is engaged and supported by the subject support structure, the same support structure can be used to support a wide variety of gage sizes which has not been possible in the past. Still further, the same support structure can be maintained on the setting fixture without having to remove or replace it with others as was done in the past with known gage support devices. This therefore eliminates the need to inventory a plurality of different size gage holders or nests.

The fact that with the present device a gage is suspended while being set rather than being firmly held in place further distinguishes the present device from prior constructions which support the gage by means which engage the contact end of the gage rather than the dial end and this represents an important advance in gage setting devices or fixtures. This also contributes to the accuracy of alignment and gage adjustment accuracy while at the same time freeing the hands of the operator making the adjustments who no longer has to hold the gage in position to support it on the setting fixture with one hand while making adjustments with the other. By being suspended there is also less pressure on the gage which can stress the gage and distort the setting accuracy. Thus, with a present device, a dial bore gage can be relatively more precisely adjusted or preset using a setting fixture because the gaging contacts can be more accurately aligned with the fixture contacts and without any stresses being placed on the gage or fixture to hold them together during setting.

It is a principal object of the present invention to provide improved and more versatile means for supporting dial bore gages and like devices while precisely aligning their gaging contacts with fixture setting surfaces.

Another object is to provide a structure for supporting a dial bore on a gage setting fixture by suspending the gage on the fixture from the dial end thereof.

Another object is to provide a device for supporting a dial bore gage on a setting fixture by means which enable adjustment of the gage contacts in a plurality of angularly related directions to more accurately align the gaging contacts with fixture setting surfaces.

Another object is to provide adjustable gage support means which can be installed for use on existing setting fixtures.

Another object is to eliminate thermal expansion that occurs in the gages due to handling by the operator during setting.

Another object is to provide more accurate means to set gaging devices used for measuring the accuracy of cylindrical surfaces.

Another object is to provide means which can be used to support a relatively wide range of dial bore gage sizes in position to be adjusted on a setting fixture.

Another object is to minimize operator influence in the setting of the gaging contacts of a dial bore gage.

Another object is to minimize errors due to misalignment between the gaging contacts of a dial bore gage and the setting surfaces on a setting fixture used for adjusting the gage.

Another object is to provide more accurate adjustable means for holding and supporting a measuring instrument such as a dial bore gage while adjusting same.

Another object is to reduce the cost of equipment used for adjusting dial bore gages by providing means that can be used in the setting of a wider range of gage sizes on the same fixture.

Another object is to provide relatively simple and easy to use means for adjusting the setting of gage type measuring instruments.

These and other objects and advantages of the present invention will become apparent to those skilled in the art after considering the following detailed specificaton in conjunction with the accompanying drawings, wherein:

DETAILED DESCRIPTION OF THE PREFERRED EMBODIMENT

Figure 1:
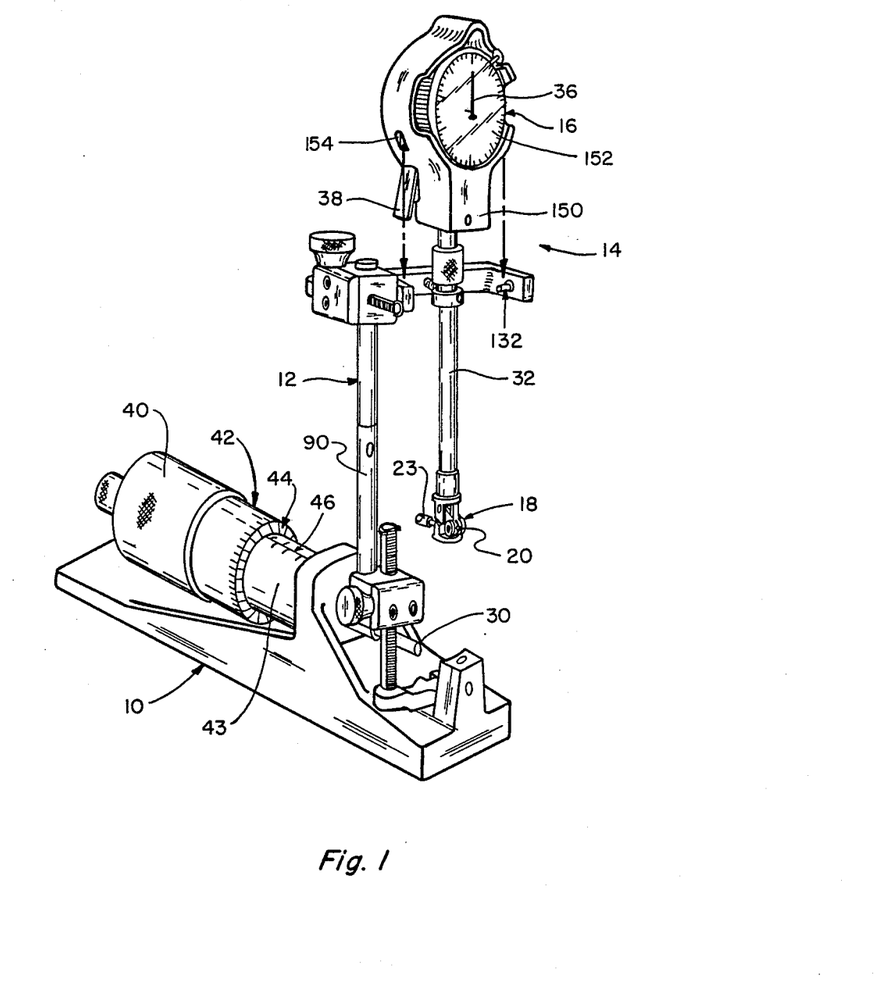
FIG. 1 is a perspective view showing a setting fixture having means installed thereon constructed according to the present invention for supporting a dial bore gage having gaging contacts, a particular setting of which is to be determined, the gage being shown in position to be placed on the support means.

Referring to the drawings more specifically by reference numbers, FIG. 1 shows a setting fixture 10 having a support structure such as gage support assembly 12 mounted thereon and shown being used supporting by suspending a dial bore gage 14 during the setting of the gage to some dimension. Dial bore gages and like measuring devices come in various sizes and shapes and generally include a dial portion 16 at one end for indicating a dimensional reading such as whether a bore diameter is over or under size. This is determined by the gage reading when the gaging contacts are in engagement with locations on a diameter of a bore being gaged. The gage also has a gaging portion 18 (FIGS. 1 and 6) having spaced and opposed work engaging contacts 20 and 22 for engaging the work surface such as a bore surface that has been honed to some desired diameter. The setting fixture 10, as will be explained, includes spaced opposed fixture setting surfaces 24 and 26 on fixture setting members 28 and 30 respectively which are the surfaces used to set the desired distance to be gaged as defined by and between the gaging contacts 20 and 22. In order to determine some precise distance determined by the fixture 10 it is necessary to know the spacing of the gaging contacts by positioning the dial portion of the gage to read some value such as zero when the contacts have the desired spacing. To do this, it is important that the contacts 20 and 22 be accurately aligned and oriented with respect to fixture surfaces 24 and 26.

The gage 14 includes an elongated connection portion 32 which extends between and connects the dial and gaging portions 16 and 18. The gaging portion 18 which is the portion of the gage 14 that includes the work engaging contacts 20 and 22 must be very accurately located relative to the fixture surfaces 24 and 26 before the gage can be accurately set. The gaging portion 18 may also include spaced work engaging centralizer members 34 which are normally biased outwardly on the gaging portion 18 and move into engagement with a work surface during a gaging operation in such a manner as to assure that the gaging contacts 20 and 22 during gaging are located on a diameter of the work surface. The centralizers are not part of the present invention.

The gaging contact 20 is spring biased outwardly on the gaging portion 18 and is operatively connected to a movable portion or needle 36 on the dial portion 16. The contact 20 is movable from a normally extended to a retracted condition when gaging a work surface. The movable contact 20 may also be retracted under control of lever 38 on the dial bore gage 14. The construction and operation of the dial bore gage 14 may be such as that disclosed in Rutter U.S. Pat. No. 4,045,877 which is assigned to applicant's assignee.

The gage contact 20, as indicated, is movable to a particular retracted condition as established by adjusting the dial portion of the gage in its housing and thereafter when the dial portion is locked in positioned, the contacts 20 and 22 can be used to determine bore size accuracy. The contact 22, unlike the contact 20, is fixedly positioned on the dial bore gage but its fixed position can be adjusted by selecting a desired length extension member 23 (FIG. 6) on which the contact 22 is mounted depending on the size of the bores whose diametral accuracy is to be measured. The contacts 20 and 22 should engage opposite ends of a diameter of the bore and this is assured by the centralizer members 34 which are pivotally mounted on the gage at spaced loctions on opposite sides of the movable contact 20. The centralizers 34, like the contact 20, are biased outwardly and operate in a well known manner.

The setting fixture 10 includes the space members 28 and 30 on which the respective fixture surfaces 24 and 26 are positioned and the distance between the fixture sufaces 24 and 26 can be accurately preset by adjusting the position of the rotatable member 40 which is part of a micrometer type adjustment member 42 which rotates and also moves axially relative to a non-rotatable member 43 to produce a setting. The adjustment member 42 has an annular scale 44 which cooperates with a linear graduated scale 46 on the member 43. When the member 40 is rotated, it causes the member 30 to move axially to adjust the position of the adjustable fixture surface 26. The spacing between the fixture surfaces 24 and 26 is indicated by the relative positions of the scales 44 and 46. In order to be sure that the contacts 20 and 22 which are to be set using the fixture 10, it is important that they be accurately aligned and centered with respect to the surfaces 24 and 26. This means an imaginary line passing through the contacts 20 and 22 when they abut the fixture surfaces 24 and 26 should be normal to said surfaces if the setting of the gage dial is to be accurate. Any misalignment, however slight, will adversely affect the accuracy of the setting of the dial bore gage 14.

The present invention resides in the novel gage support means 12 for suspending the dial bore gage 14 on the setting fixture 10 with the contacts 20 and 22 located between the surfaces 24 and 26. This should be accomplished without requiring that the operator grip or hold the gage 14 during adjustment on the fixture. It is also important to the invention that the means that support the gage be able to be adjusted in enough directions so as to establish precise alignment of the contacts 20 and 22 with the fixture surfaces 24 and 26. It is only when this condition exists that the gage contacts 20 and 22 in a particular setting can be accurately determined and used to mesaure bore surfaces. If the imaginary line through the contacts 20 and 22 is offset or angularly oriented relative to normal to the fixture surfaces 24 and 26, the distance between the contacts 20 and 22 as set in the gage will not be the same as the spacing between the surfaces 24 and 26 and the gage will be set to a dimension that is larger by some amount than desired. To the extent this is true, it will be reflected as an error in the setting of the dial bore gage. The present gage support means provide means for extremely accurately orienting the position of the contacts 20 and 22 relative to the surfaces 24 and 26 during gage setting such that zero or minimal error will occur during gaging of workpieces. The details of the construction of the dial bore gage 14 and of the setting fixture 10 are less important than the details of the gage support means 12 which are mounted on the fixture 10 and suspend the dial bore gage 14 from the dial end thereof such that the gage contacts 20 and 22 are positioned between the fixture setting surfaces 24 and 26.

Figures 2, 4:
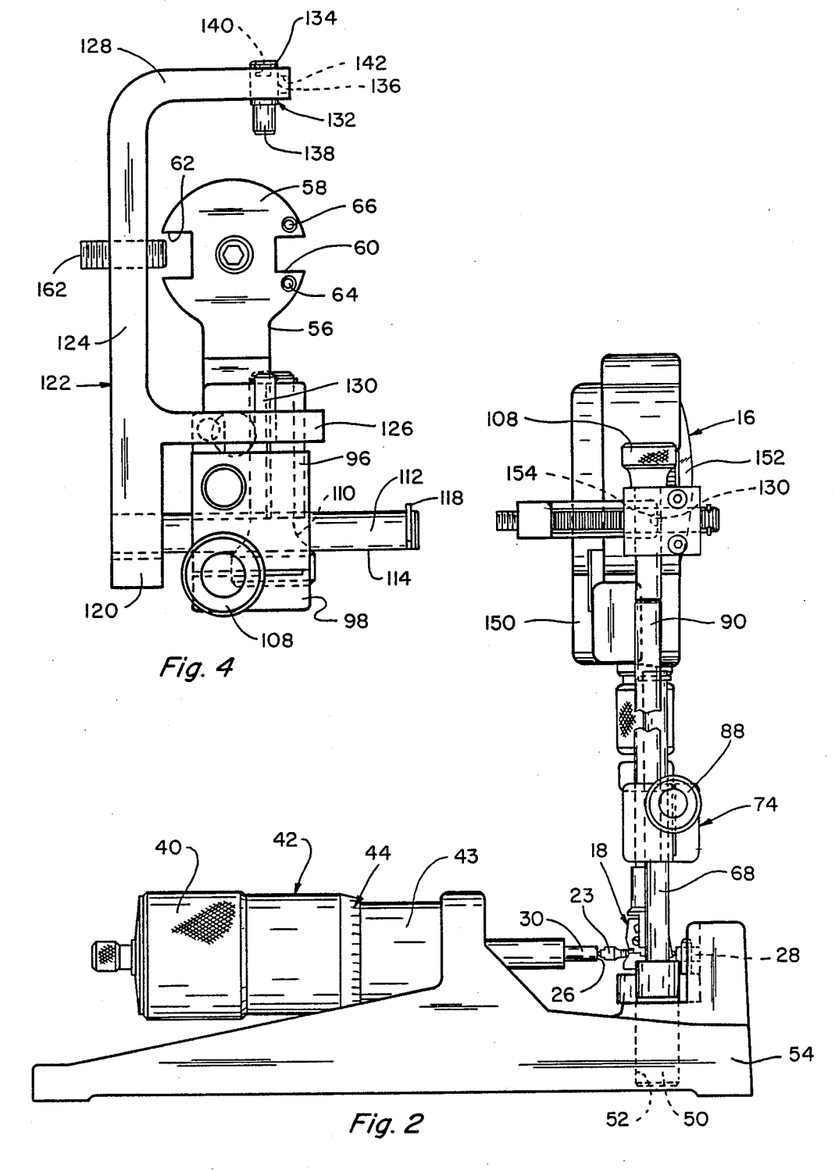
FIG. 2 is a left side elevation view of the assembly of devices shown in FIG. 1.
FIG. 4 is a top plan view of the gage support means of FIG. 3.
Figure 3:
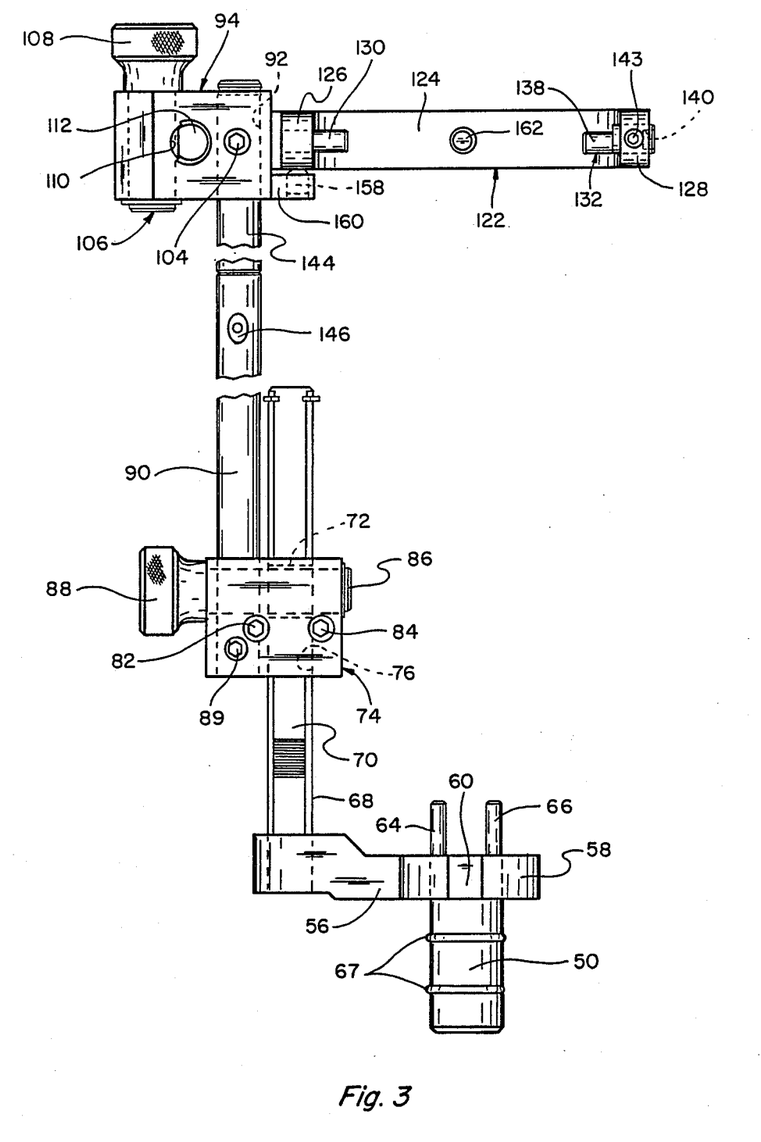
FIG. 3 is a front elevational view of the gage support means per se shown in FIGS. 1 and 2.
Figures 5, 6:
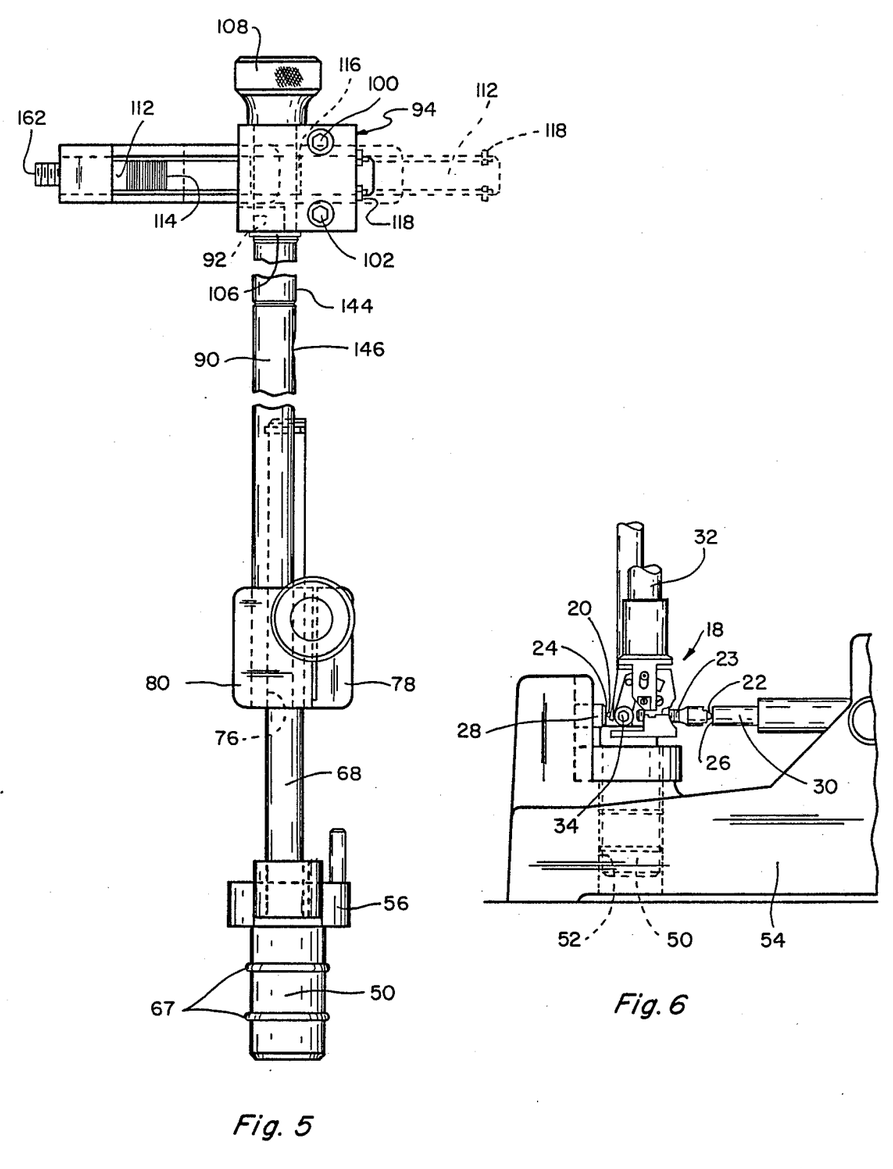
FIG. 5 is a left side elevational view of the gage support means as shown in FIG. 3.
FIG. 6 is an enlarged fragmentary side elevational view showing the gage contact portion of a dial bore gage in position to have its gaging contacts aligned with fixture setting surfaces on a setting fixture.

FIGS. 3, 4 and 5 show the structural details of the gage support assembly 12. The assembly 12 includes a mounting stud 50 which cooperates with an opening 52 provided therefor in base member 54 of the fixture 10 at a location that is below and between the fixture surfaces 24 and 26. The stud 50 is connected to a sidewardly extending member 56 (FIG. 3) which is shown having an optional rounded portion 58 with a pair of opposed notches 60 and 62 formed therein. The member 56 extends sidewardly from the locating stud 50, and the upper surface of the rounded portion 58 of the member 56 may have a pair of spaced upwardly extending pins such as pairs 64 and 66 which are positioned to stradle the fixture member 20 and to provide rough angular orientation of the assembly 12 on the fixture 10. However, the notches 60 and 62 and the pins 64 and 66 can be eliminated, if desired, to simplify the construction since they are not critical to the alignment provided by the subject assembly 12 and may be included mainly to prevent the assembly 12 from being installed backwards on the fixture 10. The mounting stud 50 may also have one or more outside grooves for receiving 0 rings 68 to engage the bore 52. When used they prevent looseness between the assembly 12 and the fixture 10.

A vertical rod 68 is mounted extending upwardly from adjacent the free end of the member 56, one side of which has a flattened serrated or geared surface or track 70 formed thereon, which track is cooperatively engaged by a roller or gear member 72 rotatably mounted on a rotatable member in a block assembly 74. The block assembly 74 has a vertically oriented passage 76 extending therethrough positioned to slidably receive the rod 68 as shown in FIG. 3. The block 74 is formed of two portions 78 and 80 (FIG. 5) which are bolted together by suitable bolts 82 and 84. The block portions 78 and 80 together accommodate a rotatable adjustment member 86 which includes knurled knob portion 88. The roller or gear 72 is fixedly positoned on the rotatable member 86 and is engageable with the serrated or gear surface or track 70 on the vertical rod 68 such that when the knob 88 is rotated the member 72 will cause the block assembly 74 to move vertically, up or down along the rod 68, depending on the direction of rotation on the member 86. The larger block portion 80 (FIG. 5) is fixedly attached as by set screw 89 to the lower end portion of another vertical rod 90 which extends upwardly therefrom and through an opening 92 in another two piece block assembly 94 which is also formed by two connected portions 96 and 98 (FIG. 4) held together by bolts 100 and 102. The block portion 96 has a threaded opening for a set screw 104 (FIG. 3) which when tightened locks the block portion 96 in fixed position on the rod 90. The block portions 96 and 98 together rotatable support another adjustment member 106 which includes knurled knob portion 108.

The larger block portion 96 also has a cross bore 110 which slidably receives a horizontal rod 112 which has a serrated or geared surface or track 114 formed on one side, which surface or track cooperatively engages a roller or gear member 116 on the adjustment member 106. When the knob 108 is rotated, the rod 112 will move horizontally through the cross bore 110.

One end of the rod 112 has a stop ring 118 mounted thereon and the opposite rod end is fixedly connected to arm 120 of a bracket assembly 122. The bracket assembly 122 as best seen in FIG. 4, includes an elongated portion 124 of which the portion 120 is an extension. The bracket also has two spaced parallel outwardly extending arms 126 and 128 which have respective opposed inwardly extending pins 130 and 132 mounted thereon. The pin 130 is fixedly attached to the arm 126, and the pin 132 includes a cylindrical portion 134 which is mounted in opening 136 in the arm 128 and an eccentric portion 138 which extends therefrom. The pin portion 134 has an exposed wrench socket 140 for receiving a wrench such as an Allen wrench which can be used to rotate the pin 132 in order to adjust the position of the eccentric pin portion 138 relative to the pin 130 for reasons which will become apparent hereinafter. The arm 128 may also have a threaded opening 142 in the end thereof for a set screw 143 used to lock in a particular setting of the pin 132.

Referring again to FIG. 5, it can be seen that the vertical rod 90 can be provided with one or more threadedly connected extensions such as extension 144 so that the effective length of the rod 90 can be increased to accommodate the setting of longer dial bore gages. The rod 90 and the extensions 144 are shown having depressions 146 which cooperate with the set screw 104 (FIG. 3) to establish predetermined vertical locked-in positions for the block assembly 94.

In FIG. 1, the dial portion 16 of the dial bore gage 14 is shown having a housing 150 which extends around and encloses most of dial portion 152. The housing 150 has similar opposed downwardly facing round bottom slots 154 formed in both opposite sides thereof and at locations to cooperatively receive and to rest on respective ones of the pins 130 and 132 and to provide support for the gage 14 in a suspended position therefrom. It is only necessary to rest the gage 14 on the pins 130 and 132 to put it in place on the assembly 12 to be adjusted. When this is done, the contact end portion 18 of the gage 14 is positioned with the gaging contacts 20 and 22 located between the fixture surfaces 24 and 26. Since the spacing between the fixture surfaces 24 and 26 is accurately preset to some desired dimension by adjusting the fixture using the rotatable member 40, it is now possible using the subject support means 12 to adjust the position of the contacts 20 and 22 so that they are in proper and precise alignment and orientation between the fixture surfaces 24 and 26. This is done by making several adjustments including adjusting the position of the eccentric pin portion 138 in the arm 128 to angularly orient the contacts 20 and 22 on the surfaces. Thereafter the various other adjustment members on the support assembly 12 including the knobs 88 and 108 are adjusted. The assembly 12 also has another adjustable threaded member 158 (FIG. 3) located in a sideward extension 160 of the block assembly 94 which threaded member engages the underside of the bracket arm 126 to maintain the arm 126 and the bracket assembly 122 in a desired horizontal position. The under surface of the arm 126 may be hardened or have a hardened member attached thereto for engagement with the threaded member 158 to prevent wear on the arm when the arm slides on the threaded member 158 during adjustment of the member 106 using the knob 108. It should be understood, however, that the order in which the various adjustments are made can be varied as desired and is not critical. A usual first adjustment is made by adjusting the knob 88 to position the bracket 122 at a desired height to accommodate the length of the gage to be set. This is done to bring the contacts 20 and 22 into a centered vertical position between the fixture surfaces 24 and 26. Next, or as an earlier step using an Allen wrench or like tool, the member 158 can be adjusted to establish a desired horizontal position for the bracket assembly 122 on the block 94. The knob 108 is then adjusted to center the contacts 20 and 22 between the surfaces 24 and 26 and to orient the horizontal line through the contacts with the axis of the members 28 and 30 on which the fixture surfaces 24 and 26 are located. This adjustment also equalizes or nearly equalizes the pressure of the contacts against the respective fixture surface 24 or 26. Finally, again using an Allen wrench, the pin 132 and/or 158 is adjusted to move the gaging contacts 20 and 22 along an arc to center the contacts 20 and 22 on the respective surfaces 24 and 26. When these adjustments are made, the measured distance established between the contacts 20 and 22 is established and can be set into the dial porton 16 of the gage by rotating the dial portion 152 in the housing 150 to give the desired zero reading condition which is the condition where the pointer 36 is on zero gage setting. When this setting is established and locked-in the gage is ready for use in the usual way.

The elongated portion 124 of the bracket assembly 122 (FIG. 4) may also have a threadedly adjustable stop member 162 centrally located thereon to abut the rear surface of the gage housing 150 for when the gage is being installed on the assembly 12. The member 162 therefore acts as a stop to prevent the gage from being moved too far back between the arms 126 and 128 of the bracket 122 and this helps to prevent the gage from accidentally being dropped.

The combination of the various adjustments as explained enables the operator to very accurately locate and align the gage contacts 20 and 22 with the fixture setting surfaces 24 and 26 and this in turn enables very accurate setting of the gage. It is also to be noted, as indicated, that the greater the distance to be measured by the contacts 20 and 22, the greater is the chance for inaccuracy especially due to angular misalignment between the gage contacts and the fixture surfaces. The present device provides means to minimize or completely eliminate such misalignment. Hence, with the present device, it is possible to produce much more accurate gage settings and measurements regardless of the size of the measurement to be made or the gage to be used. When setting a gage, however, it may be desirable to be able to rotate the gage somewhat in order to establish the minimum true setting position. This is possible because the subject holder means 12 are able to be rotated to some extent because of the way the stud 50 is installed in the opening 52 in the base 54 (FIGS. 2 and 6).

Thus, there has been shown and described novel means for supporting a dial bore gage in position while the dial portion is adjusted to some precise dimension as determined by gage contacts engaging setting fixture surfaces, which device fulfills all the objects and advantages sought therefor. It will be apparent to those skilled in the art, however, that many changes, modificiations, variations and other uses and applications for the subject device are possible, and all such changes, modifications, variations, and other uses and applications which do not depart from the spirit and scope of the invention are deemed to be covered by the invention which is limited only by the claims which follow.

What is claimed is:

1. Means for supporting a dial bore gage in position to be adjusted on a setting fixture, the gage having a dial portion a work engaging portion with spaced opposed gage contacts and means connected therebetween, the setting fixture having a base for supporting aligned fixed and adjustable fixture members each having a gage contact engaging fixture surface thereon, the improvement comprising a support structure for mounting on the setting fixture in position extending upwardly from adjacent to the space formed by and between the fixture contact engaging surfaces, the support structure including an upright member having gage support means mounted thereon for cooperative engagement with the dial portion of the gage for supporting the gage in position with the work engaging portion extending downwardly from the dial portion in suspended condition into the space defined by and between the fixture contact engaging surfaces with the gage contacts located between the fixture contact engaging surfaces, said support structure having first means associated with the upright member adjustable to change the vertical position of the gage support means and the gage supported thereon and second means associated with the gage support means adjustable to change the horizontal position of the gage on the support structure to predeterminately position the gage contacts between the fixture contact engaging surfaces.

2. The means of claim 1 including third means associated with the gage support means adjustable to change the angular orientation of the gage on the support structure.

3. The means of claim 1 wherein the gage support means includes a bracket assembly mounted on the upright member, said bracket assembly having spaced arms and means on the respective arms for cooperative engagement with spaced means on the dial portion of the gage.

4. The means of claim 3 including means on structure engageable with the bracket assembly adjustable to change the orientation of the bracket arms thereon.

5. The means of claim 1 wherein the means on the support structure for mounting the support structure on the setting fixture includes means to enable limited rotational movement of the support structure thereon 6. The means of claim 1 wherein the upright member includes a rod member having a track formed along one side thereof, the first means associated therewith include a member mounted for movement along the rod member, said first means including an adjustment member on the member mounted on the rod member engageable with the track to adjust the position of said support member on the rod.

7. The means of claim 1 wherein the second means includes a horizontal rod member and means supporting the horizontal rod member on the said gage support means including a rotatable adjustment member having means engageable with the horizontal rod adjustable to reposition the horizontal rod relative to the upright member.

8. The means defined in claim 3 wherein each of the arms of the bracket assembly has a pin member mounted thereon, said pins extending in opposed relationship, the dial portion of the gage having spaced means formed therein to cooperatively engage respective ones of the pins.

9. The means defined in claim 8 wherein one of said pins has an eccentric portion for engagement with the respective means formed on the dial portion of the gage.

10. The means of claim 1 wherein the support structure is pivotally mounted on the setting fixture.

11. The means of claim 3 including means to limit movement of the dial portion of the gage into the space defined by and between the spaced arms of the bracket assembly.

12. A structure for supporting a gage having spaced connected dial and gaging portions on a setting fixture having spaced members with fixture surfaces arranged in opposed relation comprising and upright assembly having a first end portion for mounting on the setting fixture and a second end portion positioned above the first end portion when mounted, means on the second end portion engageable with the dial portion of the gage for supporting the gage in a position such that the gaging portion is positioned between the opposed fixture surfaces, means on the upright member adjustable to change the vertical position of the second end portion of the upright assembly, and other means on the second portion of the gage adjustable for changing the horizontal position of the means on the second portion engageable with the dial portion of the gage.

13. The structure of claim 12 including third means on the second end portion of the upright assembly adjustable to change the angular orientation of the gage relative to the setting fixture.

14. The structure of claim 12 wherein the means mounting the upright assembly on the setting fixture includes means to enable limited angular movement of the upright assembly on the setting fixture.

15. The structure of claim 12 wherein the means on the second end portion of the upright assembly for supporting the gage includes a bracket assembly having spaced and opposed arm portions each having means thereon for engaging the dial portion of the gage at a spaced location thereon.

16. The structure of claim 15 including means adjustable to establish the position of the spaced opposed arms of the bracket assembly on the upright assembly.

17. The structure of claim 12 wherein the means adjustable to change the vertical position of the second end portion of the upright assembly includes a vertical rod having track means formed extending therealong, and a block assembly positioned for longitudinal movement along the rod member, said block assembly having a rotatable member with a portion engageable with the track on the rod whereby rotation of the rotatable member changes the position of the assembly on the rod.

18. Nesting means for supporting a gaging device on a setting fixture, said gaging device and setting fixture each having spaced and opposed surfaces, the opposed surfaces of said gaging device to be placed in alignment with said opposed surfaces of said setting fixture, the distance between said opposed surfaces on both the gaging device and setting fixture being adjustable, the improvement comprising a support assembly having means to support said gaging device in position whereby said opposed surfaces on the gaging device are located intermediate the opposed surfaces on the setting fixture, said gaging device and said support assembly having a cooperatively engageable portions for supporting the gaging device on the support assembly, and means on the support assembly to enable adjusting the orientation of the opposed surfaces on the gaging device relative to the opposed surfaces on the setting fixture.

19. The nesting means of claim 18 wherein said cooperatively engageable surface for supporting the gaging device on the support assembly includes a substantially U-shaped member defined by spaced leg portions and a member extending between and substantially perpendicular to said leg portions.

20. The nesting means of claim 19 wherein said substantially U-shaped member has spaced and opposed means on said leg portions for engaging spaced and opposed surfaces on the gaging device.

21. The nesting means of claim 20 wherein said spaced and opposed means on the leg portions for supporting the gaging device include pin members.

22. The nesting means of claim 21 wherein at least one of said pins has an eccentric portion.

23. The nesting means of claim 21 wherein at least one of the pins is cylindrical.

24. The nesting means of claim 18 wherein said support assembly is rotatable on the setting fixture.

* * * * *

UNITED STATES PATENT OFFICE
CERTIFICATE OF CORRECTION

Patent No. 4,796,363      Dated January 10, 1989

Inventor(s) Harold T. Rutter and Joseph F. Ondrus, Jr.

It is certified that error appears in the above-identified patent and that said Letters Patent is hereby corrected as shown below:

In the abstract, line 11, "feture" should be -- feature --.

In the abstract, line 14, "suported" should be -- supported --.

Signed and Sealed this

Thirtieth Day of May, 1989

Attest:

DONALD J. QUIGG

Attesting Officer

Commissioner of Patents and Trademarks